Sept. 25, 1923.

E. W. JOHNSTON

COUPLING

Filed Jan. 6, 1921

1,468,707

Inventor,
E. W. Johnston.
By C. A. Snow & Co.
Attorneys

Patented Sept. 25, 1923.

1,468,707

UNITED STATES PATENT OFFICE.

EDWARD W. JOHNSTON, OF SPRINGFIED, ILLINOIS.

COUPLING.

Application filed January 6, 1921. Serial No. 435,418.

*To all whom it may concern:*

Be it known that I, EDWARD W. JOHNSTON, a citizen of the United States, residing at Springfield, in the county of Sangamon and State of Illinois, have invented a new and useful Coupling, of which the following is a specification.

The invention aims to provide a structure which, through the instrumentality of a simple mechanism, will attain a secure hold on a hose or other object, it being possible to release the hold readily, upon occasion.

Figure 1:
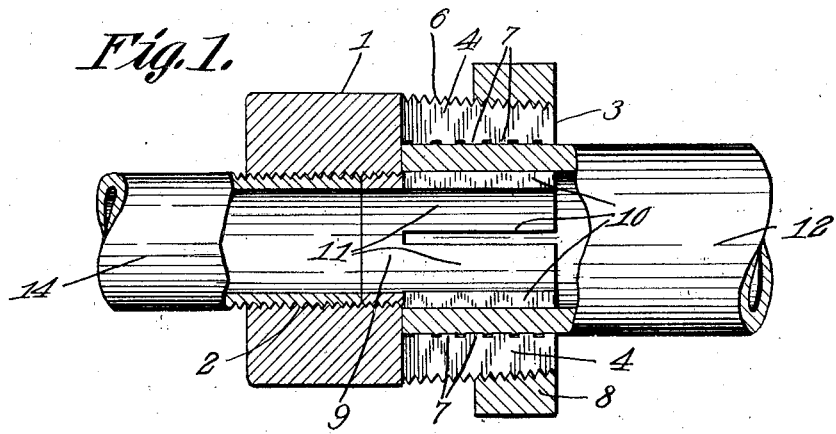
Figure 2:
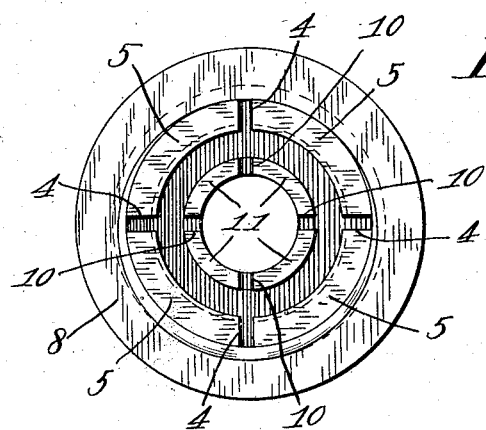

Figure 1 shows in longitudinal section, a device constructed in accordance with the invention, parts appearing in elevation; Figure 2 is an end elevation wherein the hose is omitted.

The structure includes an annular body 1 provided at one end with a threaded bore 2 and supplied at its opposite end with a sleeve 3 having longitudinal slits 4 defining compressible arms 5, the sleeve 3 being tapered toward its free end, and threaded, as shown at 6. The arms 5 are provided with internal transverse ribs 7. A collar 8 is threaded on the arms 5. A nipple 9 is located within the sleeve 3 and is threaded at its inner end into the bore 2 of the body 1. The nipple 9 is supplied with longitudinal slits 10 defining compressible arms 11.

One end of a hose or other tube 12 is inserted between the nipple 9 and the sleeve 3, the hose abutting at its inner end against the body 1. When the collar 8 is advanced along the arms 4, the arms will be compressed, and the ribs 7 will engage the hose 12, the hose thus being bound between the arms 3 and the arms 11, the last specified arms yielding slightly, and affording, with the arms 4, a strong hold on the hose. The numeral 14 denotes a connection which may form part of a turbine, one end of the connection being threaded into the bore 2 of the body 1. The connection 14 abuts against the inner end of the nipple 9, and the nipple, therefore forms a stop for the part 14.

Having thus described the invention, what is claimed is:—

1. In a device of the class described, an annular body provided with inner and outer compressible arms, the outer arms being tapered and threaded, and a nut threaded on the outer arms, the inner arms being spaced from the outer arms, for the reception of a tubular member.

2. In a device of the class described, an annular body provided at one end with a threaded bore and supplied at its opposite end with a tapered sleeve which is externally threaded, the sleeve having longitudinal slits defining compressible arms; a nipple threaded at one end into the bore of the body and having its opposite end disposed within the sleeve, said opposite end of the nipple having longitudinal slits defining compressible arms; a tubular member threaded into the bore of the body and abutting against one end of the nipple; a tubular member extended between the arms of the sleeve and the arms of the nipple and abutting against the body; and a collar threaded on the arms of the sleeve.

In testimony that I claim the foregoing as my own, I have hereto affixed my signature in the presence of two witnesses.

EDWARD W. JOHNSTON.

Witnesses:
HENRY SOMMER,
EDWARD H. RISHTER.